United States Patent
Edwards et al.

(10) Patent No.: US 9,577,887 B2
(45) Date of Patent: Feb. 21, 2017

(54) ICM FOOT-PRINT WITH UPOE SUPPORT

(71) Applicant: Cisco Technology, Inc., San Jose, CA (US)

(72) Inventors: William Frank Edwards, Livermore, CA (US); Keith Frank Tharp, San Jose, CA (US); Ken Naumann, Livermore, CA (US); Amrik Bains, Livermore, CA (US); Clark Carty, Brunswick, OH (US); Alan Yee, Los Gatos, CA (US); Arvind Kansal, Cupertino, CA (US); Samir Bouadjel, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 196 days.

(21) Appl. No.: 14/297,681

(22) Filed: Jun. 6, 2014

(65) Prior Publication Data

US 2015/0172221 A1 Jun. 18, 2015

Related U.S. Application Data

(60) Provisional application No. 61/916,390, filed on Dec. 16, 2013.

(51) Int. Cl.
*H04L 12/28* (2006.01)
*H04B 7/185* (2006.01)
(Continued)

(52) U.S. Cl.
CPC ............ *H04L 41/083* (2013.01); *G06F 13/40* (2013.01); *H04L 1/002* (2013.01); *H04L 5/1446* (2013.01);
(Continued)

(58) Field of Classification Search
CPC .... H04L 41/083; H04L 12/4013; H04L 49/40; H04L 69/323; G01F 13/40
See application file for complete search history.

(56) References Cited

U.S. PATENT DOCUMENTS 7,000,031 B2 2/2006 Fischer et al.
7,977,951 B1 7/2011 Lo et al.
(Continued)

FOREIGN PATENT DOCUMENTS

WO 2007/140467 A2 12/2007
WO 2011/103070 A1 8/2011

OTHER PUBLICATIONS

Copending U.S. Appl. No. 14/273,681, filed May 9, 2014 entitled "Adjustable Data Rates".

(Continued)

*Primary Examiner* — Brian Roberts
*Assistant Examiner* — Abu-Sayeed Haque
(74) *Attorney, Agent, or Firm* — Merchant & Gould P.C.

(57) ABSTRACT

Power Over Ethernet (POE)/universal power over Ethernet (UPoE) may be enabled at multigigabit port-channel connections. This may allow for additional speed support in auto-negotiation messages while employing multigigabit speeds. An integrated connector module (referred to herein as a "ICM") compatible with UPoE with a modified local physical layer (PHY) circuit may be capable of supporting multi-gigabit data rates (such as between 1 G to 10 G, e.g., 2.5 G and 5 G) as to not limit the data rates to 1 G. The ICM may provide multi-gig data transmission through a first plurality of pins comprising a multi-gig data pin area. Furthermore, the ICM may provide UPoE power to support the multi-gig transmission through a second plurality of pins comprising a UPoE power pin area.

20 Claims, 8 Drawing Sheets

(51) Int. Cl.
*H04B 7/00* (2006.01)
*G01R 31/08* (2006.01)
*H04L 12/24* (2006.01)
*H04L 12/10* (2006.01)
*G06F 13/40* (2006.01)
*H04L 1/00* (2006.01)
*H04L 5/14* (2006.01)
*H04L 12/40* (2006.01)
*H04L 12/931* (2013.01)
*H04L 29/08* (2006.01)
*H04L 12/935* (2013.01)

(52) U.S. Cl.
CPC .......... *H04L 12/10* (2013.01); *H04L 12/4013* (2013.01); *H04L 49/40* (2013.01); *H04L 49/3054* (2013.01); *H04L 69/323* (2013.01)

(56) References Cited

U.S. PATENT DOCUMENTS

| | | | | |
|---|---|---|---|---|
| 8,295,163 | B1* | 10/2012 | Schmalz | H04L 43/0811 |
| | | | | 324/533 |
| 8,370,701 | B2 | 2/2013 | Diab et al. | |
| 9,294,355 | B2 | 3/2016 | Edwards et al. | |
| 2005/0024026 | A1* | 2/2005 | Hung | G06F 1/263 |
| | | | | 323/255 |
| 2005/0078700 | A1* | 4/2005 | Thompson | H04L 12/10 |
| | | | | 370/463 |
| 2007/0041577 | A1* | 2/2007 | Ghoshal | H04L 12/10 |
| | | | | 379/413 |
| 2007/0082550 | A1* | 4/2007 | Hemmah | H01R 27/02 |
| | | | | 439/607.01 |
| 2007/0192505 | A1 | 8/2007 | Dalmai | |
| 2007/0208961 | A1* | 9/2007 | Ghoshal | G06F 1/189 |
| | | | | 713/300 |
| 2007/0263707 | A1 | 11/2007 | Theodoras, II | |
| 2009/0097442 | A1* | 4/2009 | Diab | H04L 12/40136 |
| | | | | 370/329 |
| 2010/0178054 | A1* | 7/2010 | Cain | H04L 69/08 |
| | | | | 398/58 |
| 2012/0301134 | A1* | 11/2012 | Davari | H04L 41/5038 |
| | | | | 398/9 |
| 2015/0172110 | A1 | 6/2015 | Edwards et al. | |
| 2016/0204950 | A1 | 7/2016 | Edwards et al. | |

OTHER PUBLICATIONS

International Search Report dated Mar. 31, 2015 cited in Application No. PCT/US2014/070643, 14 pgs.
U.S. Office Action dated Mar. 3, 2015 cited in U.S. Appl. No. 14/273,681, 23 pgs.
International Search Report dated Apr. 20, 2015 cited in Application No. PCT/US2014/070635, 6 pgs.
U.S. Office Action dated Jun. 18, 2015 cited in U.S. Appl. No. 14/273,681, 29 pgs.
International Search Report dated Dec. 17, 2015 cited in Application No. PCT/US2014/070635, 18 pgs.
Notice of Allowance dated Nov. 18, 2015 cited in U.S. Appl. No. 14/273,681, 9 pgs.
U.S. Appl. No. 15/075,160, filed Mar. 20, 2016 entitled "Adjustable Data Rates".

* cited by examiner

ICM FOOT-PRINT WITH UPOE SUPPORT

RELATED APPLICATION

Under provisions of 35 U.S.C. §119(e), Applicants claim the benefit of U.S. provisional application No. 61/916,390, filed Dec. 16, 2013, which is incorporated herein by reference.

TECHNICAL FIELD

The present disclosure relates generally to data communications.

BACKGROUND

Current cabling infrastructures provide data communications over networks such as Ethernet networks. Many of the current cabling infrastructures use Category 5e copper cables. Wireless access points may experience tremendous demand for more bandwidth beyond the 1 Gigabit Ethernet that may presently be provided through present Category 5e infrastructures. Furthermore, the access points typically require power to be provided to them across the infrastructure cabling.

There exists a need to leverage the existing customer cabling infrastructure to allow for additional bandwidth and power delivery upgrades for the next generation of wireless technology. This needs to be accomplished while maintaining customer technology as plug and play while the cable plant is upgraded. Current Ethernet standards do not provide an adequate solution.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Power Over Ethernet (POE)/universal power over Ethernet (UPoE) may be enabled at multigigabit port-channel connections. This may allow for additional speed support in auto-negotiation messages while employing multigigabit speeds. An integrated connector module (referred to herein as a "ICM") compatible with UPoE with a modified local physical layer (PHY) circuit may be capable of supporting multi-gigabit data rates (such as between 1 G to 10 G, e.g., 2.5 G and 5 G) as to not limit the data rates to 1 G. The ICM may provide multi-gig data transmission through a first plurality of pins comprising a multi-gig data pin area. Furthermore, the ICM may provide UPoE power to support the multi-gig transmission through a second plurality of pins comprising a UPoE power pin area.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Embodiments of the disclosure employing may enable Ethernet data rates from 10 Megabits and higher using 802.3 standard MAC coding. Further embodiments of the disclosure may enable an 802.11 access point to support 2.5 Gigabits/5 Gigabits over the Category 5e cables. Further embodiments of the disclosure may allow for migration from 10 Megabits and higher rates without the need to upgrade the access point or other switch hardware.

Described embodiments may enable Power Over Ethernet (POE)/universal power over Ethernet (UPoE) at multigigabit port-channel connections. This may allow for additional speed support in auto-negotiation messages while employing multigigabit speeds. Such embodiments may be accomplished through the use of an integrated connector module (referred to herein as a "ICM") compatible with UPoE with a modified local physical layer (PHY) circuit capable of supporting multi-gigabit data rates (such as between 10 MG to 10 G, e.g., 2.5 G and 5 G) as to not limit the data rates to 1 G. The PHY circuit may be connected to and from application-specific integrated circuits (ASIC) using Serial Gigabit Media Independent Interface (SGMII) protocol.

Figure 1:
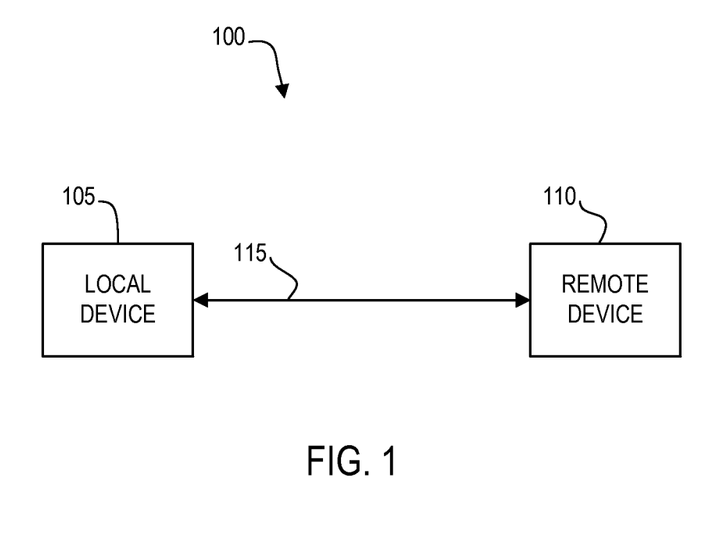
FIG. 1 is a block diagram of a communications system.

FIG. 1 shows a communications system 100. As shown in FIG. 1, communications system 100 may comprise a local device 105 and a remote device 110. Local device 105 and remote device 110 may comprise, but are not limited to, networking devices such as routers, switches, or any type of devices used in a network. Consistent with embodiments of the disclosure local device 105 may supply power to remote device 110. For example, local device 105 may comprise universal power over Ethernet (UPoE) power source equipment to power remote device 110 that may comprise a UPoE powered device.

Local device 105 and remote device 110 may be connected via a cable 115 as shown in FIG. 1. Cable 115 may comprise any type of cable including, for example, Category 5, Category 5e, and Category 6 cable. Category 5 may comprise a twisted pair cable for carrying signals. Each twisted pair in a Category 5 cable may have differing precise numbers of twists per unit length to minimize crosstalk between the pair. Although cable assemblies containing 4 pair may be used, Category 5 is not limited to just four pair.

For example, backbone applications may involve using up to 100 pair. This use of balanced lines may help preserve a high signal-to-noise ratio despite interference from both external sources and crosstalk from other pair. The Category 5e specification may improve upon the Category 5 specification by tightening some crosstalk specifications and introducing new crosstalk specifications that were not present in the original Category 5 specification. Compared with Category 5 and Category 5e, Category 6 may feature even more stringent specifications for crosstalk and system noise.

In addition to carrying data between local device 105 and remote device 110, cable 115 may provide electrical power from local device 105 (UPoE power source equipment) to remote device 110 (UPoE powered device). Consequently, cable 105 may provide both data and electrical power.

Figure 2:
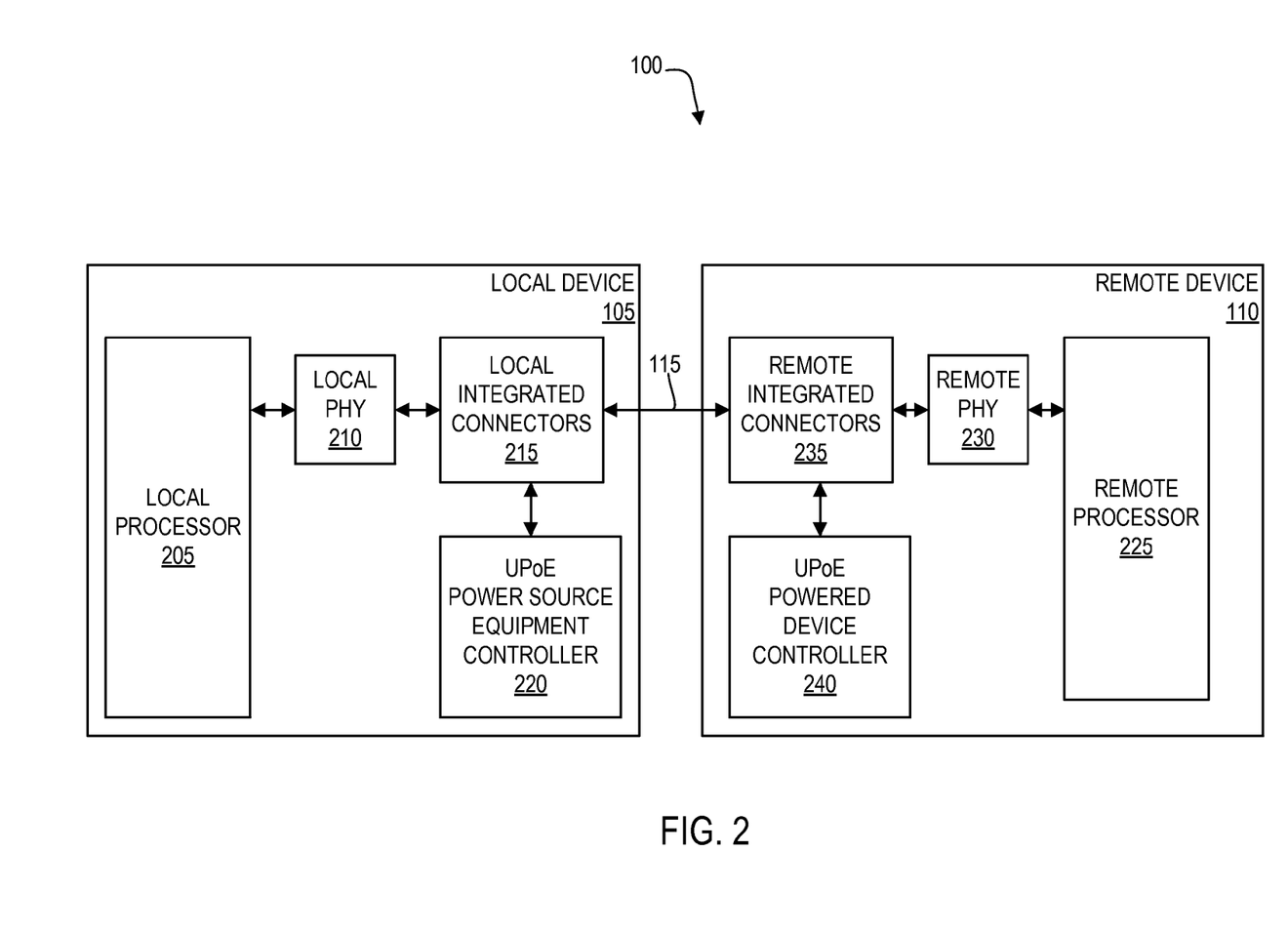
FIG. 2 is a block diagram of a communications system.

FIG. 2 shows communications system 100 in more detail. As shown in FIG. 2, local device 105 may comprise a local processor 205, a local physical layer (PHY) circuit 210, local integrated connectors 215, and a UPoE power source equipment controller 220. Remote device 110 may comprise a remote processor 225, a remote PHY circuit 230, remote integrated connectors 235, and a UPoE powered device controller 240.

Local processor 205 and remote processor 225 may each comprise an application-specific integrated circuit (ASIC). An ASIC may comprise an integrated circuit (IC) customized for a particular use, rather than intended for general-purpose use. Moreover, local processor 205 and remote processor 225 may each comprise a central processing unit (CPU). A CPU may comprise a hardware chip within a computer that carries out instructions of a computer program by performing basic arithmetical, logical, and input/output operations.

Local PHY circuit 210 and remote PHY circuit 230 may each comprise PHY circuits. A PHY circuit may connect a link layer device (e.g., a Media Access Control, or MAC address) to a physical medium such as an optical fiber or copper cable (e.g., cable 115). A PHY circuit may include a Physical Coding Sublayer (PCS) and a Physical Medium Dependent (PMD) layer. The PCS may encode and decode the data that is transmitted and received. The purpose of the encoding may be to make it easier for the receiver to recover the signal.

Local integrated connectors 215 and remote integrated connectors 235 may each comprise integrated connectors (ICMs). Integrated connectors may be used to interface a device (e.g., local device 105 or remote device 110) to the world outside the device. When constructing the device, an Electromagnetic Interference (EMI) containment feature called a "Faraday Cage" may be designed into the device. A Faraday Cage may comprise an enclosure formed by conducting material or by a mesh of conducting material. This enclosure may block external static and non-static electric fields. Consequently, a Faraday Cage may comprise an approximation to an ideal hollow conductor. Externally or internally applied electromagnetic fields produce forces on charge carriers (i.e., electrons) within the ideal hollow conductor. The charges are redistributed accordingly (e.g., electric currents may be generated). Once the charges have been redistributed so as to cancel the applied electromagnetic field inside, the currents stop.

Local device 105 may comprise UPoE power source equipment used to supply power from local device 105 over cable 115. UPoE power source equipment controller 220 may control the power supplied from local device 105. Remote device 110 may comprise an UPoE powered device. In other words, remote device 110 may receive both data and electrical power from cable 115. UPoE powered device controller 240 may control the power received over cable 115 (e.g., from local device 105).

Figure 3:
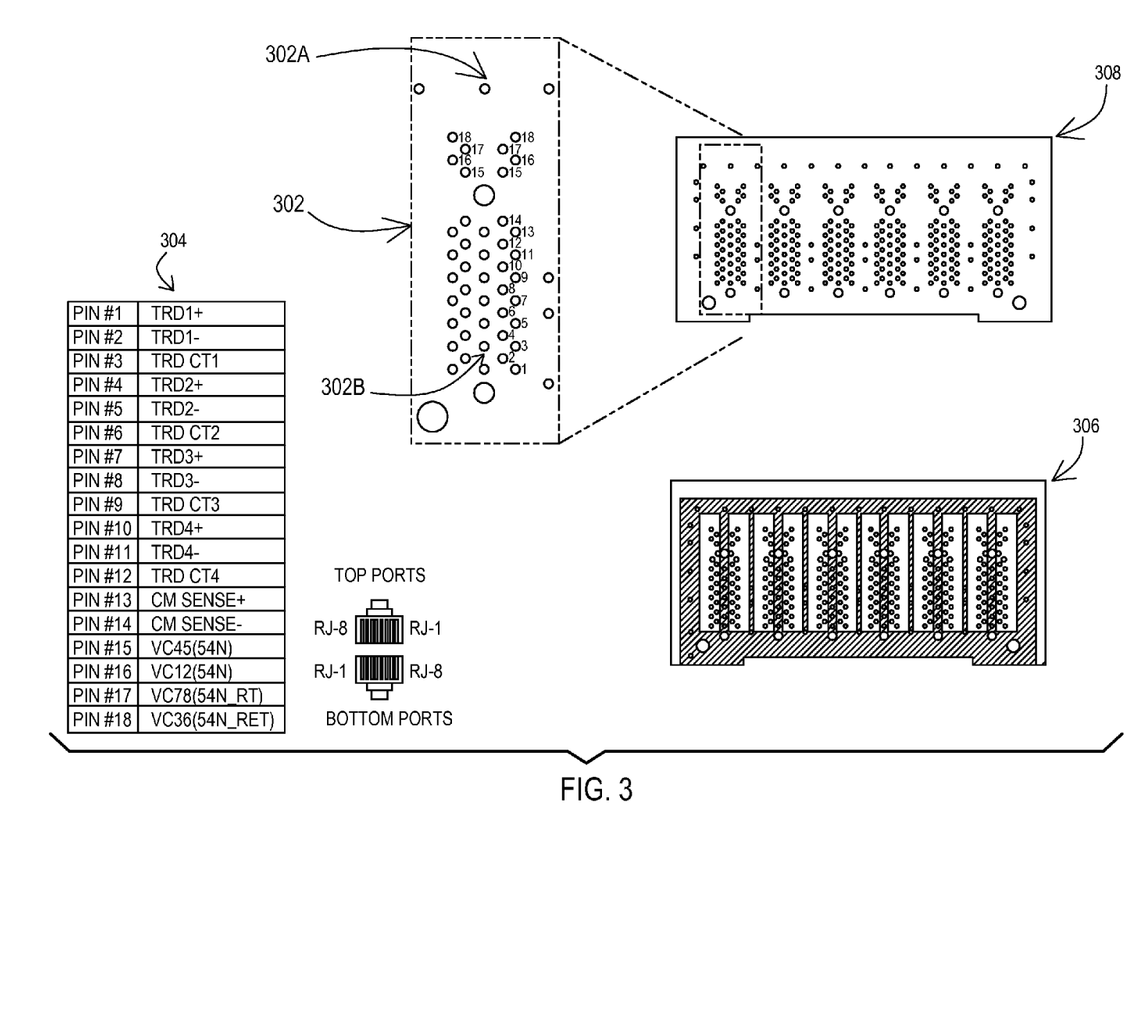
FIG. 3 shows embodiments of the present disclosure of integrated connectors.

FIG. 3 shows embodiments of the present disclosure of ICMs (such as the integrated connectors illustrated in FIG. 2). Connector 302 illustrates a single slice (of two ports) of a 2×6 ICM pin connector foot-print with UPoE support on 4 pairs of pin connectors 14-18 and the remaining 14 pin connectors are designated as Multi-Gigabit pin connectors 1-14. Connector 302 may also include a port ground connector pin 302a. Furthermore, connector 302 may comprise a number of inner shield pins 302b for use with port ground connector pin 302a Table 304 illustrates embodiments of a pin assignment for a printed circuit board, such as connector 302. Table illustrates pin assignments for each of data pins 1-18. Data pins 1-14 are designated for use to provide variable multi-speed connections for the user. Pin 15 is the power source for existing POE with pin 17 being the return. This provides backward compatibility with POE. Pin 16 is the power source and pin 18 is the return for the additional power lane.

Connection area 306 illustrates a non-limiting example of spacing multiple components including a plurality of connectors 302. While specific spacing numbers are disclosed herein, it should be understood that different spacing may be used within the scope of this disclosure. Printed circuit board 308 provides further spacing examples corresponding to the layout of connectors 302.

Figure 4:
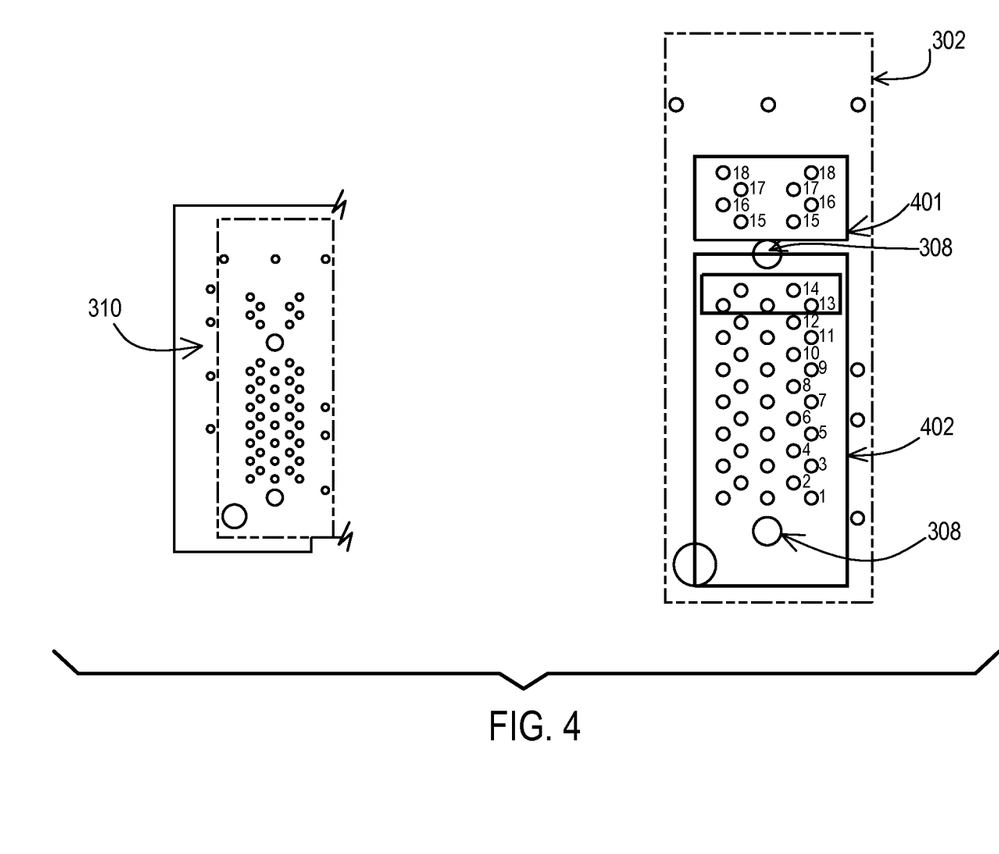
FIG. 4 shows embodiments of connector 302 according to embodiments of the present disclosure.

FIG. 4 shows embodiments of connector 302 according to embodiments of the present disclosure. Here connector 302 is shown in closer detail with certain areas highlighted for purposes of discussion. UPoE area 401 illustrates the four pins (pins 15-18) which are used to provide UPoE power and related messages. It should be noted that UPoE area 401 is designed to provide 60 W of power and must be segregated from the other pins to avoid interference with the signal pins.

IEEE high voltage (2 kV) safety isolation methods may be employed to ensure proper spacing between the shield/emission pins 310, the pins in the UPoE area 401 and the signal pins in the multi-gig area 402

UPoE may be an efficient mechanism for power delivery since it uses all four twisted pairs within the Ethernet cable to deliver power (as opposed to two twisted pairs used by other implementations). This effectively reduces the channel losses by half for the same power delivered over UPOE vs. prior implementations. Moreover, the recommendation published by cabling standards—ISO/IEC and TIA/TR-42 as part of formal liaison committee with IEEE 802.3—indicate that UPoE can be supported over the same standard cabling infrastructures that conform to existing requirements.

Multi-Gig area 402 highlights the pins available for variable multi-gig transmission of data through connector 302. The multi-gig area 402 allows for variable data speeds including, but not limited to 10 Gig, 5 Gig, 2.5 Gig, and 1 Gig. The UPoE pins provide the 60 W power necessary to operate such a multi-gig configuration.

While presently illustrated embodiments show a traditional 14 pin setup, other embodiments contemplated in this disclosure include layouts that account for varying space considerations. For example, The pins highlighted as $5^{th}$ channel CM sense pins 406 (e.g., $5^{th}$ channel Common Mode (CM) sense pins), which may include pins 13 and 14 may be removed to minimize the depth of connector 302.

Figure 5:
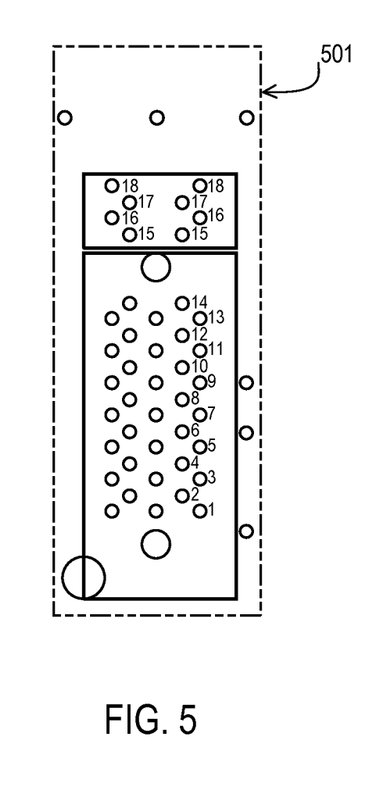
FIG. 5 shows embodiments of connector 302 according to embodiments of the present disclosure.

Another considered embodiment for reducing the depth of connector 302 involves the removal of the center tap pins. In FIG. 4, these pins may correspond to pins 3, 6, 9, and 12. Another embodiment to reduce the depth of connector 302 may involve the removal of alignment pins 308. Connector 501 as illustrated in FIG. 5 shows embodiments of connector 302 where the 5$^{th}$ channel common mode (CM) sense pins have been removed to achieve a depth savings in connector 501.

Figure 6:
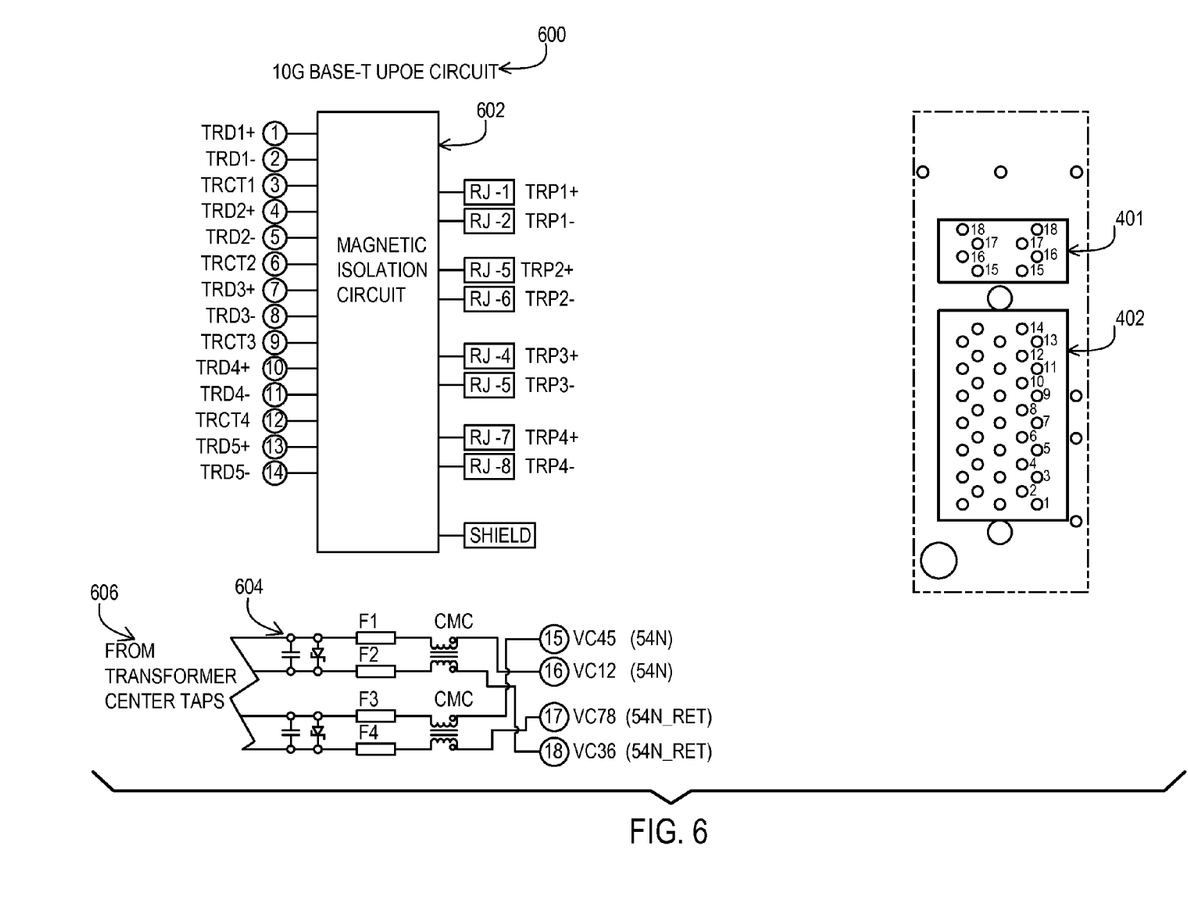
FIG. 6 illustrates embodiments of a 10 G Base-T UPoE Circuit 600 corresponding to connector 302.

FIG. 6 illustrates embodiments of a 10 G Base-T UPoE Circuit 600 corresponding to connector 302. 10 G Base-T UPoE Circuit 600 may comprise a magnetic isolation circuit 602 to which pins contained in the multi-gig area 401 are connected. As can be seen, the pins contained in the multi-gig area 402 are connected to a number of input/output connections to allow for different levels of provided bandwidth to a user.

Wiring diagram 604 illustrates the connection with the pins in the UPoE area 402 and the transformer center taps 606. In some embodiments, transformer center taps 606 may include fuses and/or protection devices as well as inductor (common mode choke) in the power path. These power hookup allow the pins in the UPoE area 402 to provide 60 W connection power to connector 302.

Figure 7:
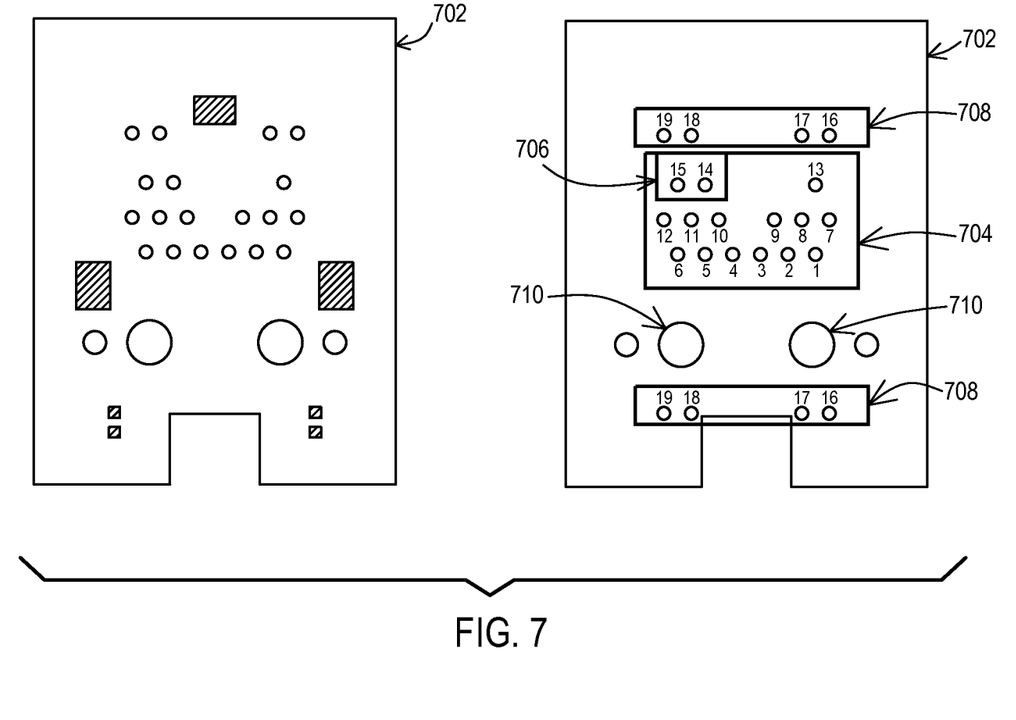
FIG. 7 illustrates alternative connector configuration embodiments according to the present disclosure.

FIG. 7 illustrates alternative connector configuration embodiments according to the present disclosure. For example, connector 702 illustrates a pin layout such that multi-gig area 704 allows for variable allowable data speeds including, but not limited to 10 Gig, 5 Gig, 2.5 Gig, and 1 Gig.

Multi-gig area 704 comprises 15 pins (pins 1-15). Pins 14 and 15 are 5$^{th}$ channel Common Mode (CM) sense pins 706 which may be removed for depth considerations as discussed above. Another considered embodiment for reducing the depth of connector 702 involves the removal of the center tap pins. In FIG. 7, these pins may correspond to pins 3, 6, 9, and 12. Another embodiment to reduce the depth of connector 702 may involve the removal of alignment pins 710.

UPoE area 708 illustrates the four pins (pins 16-19) which are used to provide UPoE power and related messages. It should be noted that UPoE area 708 designed to provide 60 W of power and must be segregated from the other pins to avoid interference with the signal pins.

Printed circuit board footprint 710 illustrates a non-limiting example of spacing multiple components within connector 702. While specific spacing numbers are disclosed herein, it should be understood that different spacing may be used within the scope of this disclosure. Spacing is illustrated as to highlight the IEEE high voltage (2 kV) safety isolation methods as employed above.

As can be seen in FIG. 7, the UPoE area 708 is located directly above both multi-gig area 704 and alignment pins 710. This "back option" width is optimized for systems with side to side geometry constraints. FIG. 7 also illustrates embodiments of the present disclosure of connector 702, wherein the UPoE area 708 is located directly below both multi-gig area 704 and alignment pins 706 ("front option"). The front option may be width optimized for when the center taps are on the line side of a transformer. This option may help to avoid overlap and subsequently optimize implementation cost. Embodiments are also considered herein where a UPoE area may reside between multi-gig area 704 and alignment pins 710.

Figure 8:
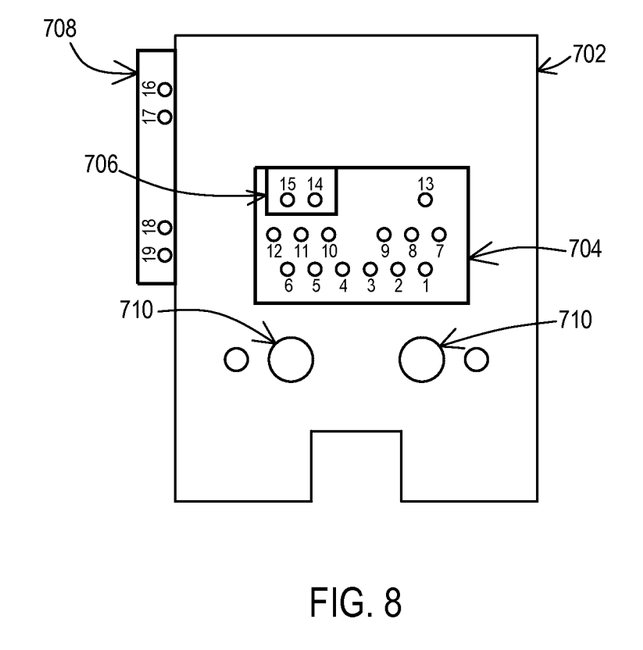
FIG. 8 illustrates additional embodiments of connector 702 wherein UPoE area 708 is located on the side of connector 702.

FIG. 8 illustrates additional embodiments of connector 702 wherein UPoE area 708 is located on the side of connector 702. Such embodiments may provide increased depth minimization for systems with depth constraints.

Embodiments of the present disclosures describe for example, a system comprising: an integrated connector module comprising: a multi-gig pin area comprising a plurality of signal pins capable of supporting multi-gigabit data rates and a UPoE pin area comprising of four pins enabling universal power over Ethernet (UPoE). The multi-gig pin area may comprise 14 or 15 signal pins for example.

The UPoE pin area may be located in various positions depending upon the desired geometry for the integrated connector module. For example, the UPoE area may be positioned above, below, or to the side of the multi-gig pin area. To further geometrical and depth considerations, 5$^{th}$ channel Common Mode sense pins may be removed from the multi-gig pin area. Similarly, center tap pins may be capable of removal for minimization of a depth associated with the integrated connector module.

The UPoE pin area may comprise four pins enabling power to the multi-gig pin area for data transmission at a plurality of the following Ethernet data rates: 10 Megabit, 100 Megabit, 1 Gigabit, 2.5 Gigabit, 5 Gigabit, and 10 Gigabit. The multi-gig pin area and the UPoE area may be separated by a clearance at least far enough to meet IEEE high voltage (2 kV) safety isolation distance.

Further embodiments of the present disclosures describe for example, a system comprising: an integrated connector module capable of supporting multi-gigabit data rates, wherein the integrated connector module enables universal power over Ethernet (UPoE) through four pins located on the integrated connector module separate from a plurality of pins supporting multi-gigabit data rates. The multi-gigabit rates may be accommodated using Serial Gigabit Media Independent Interface (SGMII) protocol. The SGMII protocol may be coded to carry data at a plurality of the following Ethernet data rates: 10 Megabit, 100 Megabit, 1 Gigabit, 2.5 Gigabit, 5 Gigabit, and 10 Gigabit. The SGMII protocol may be coded to change from a first data rate to a second data rate of the plurality of data rates.

The integrated connector module may further comprise a physical layer (PHY) circuit connected to and from an application-specific integrated circuit (ASIC) wherein the multi-gigabit data rates are supported by the PHY circuit. The physical layer (PHY) circuit may be connected to and from an application-specific integrated circuit (ASIC) through a fast auto-negotiation process to determine an appropriate data rate.

The integrated connector module may be part of a connector for a cable over 100 meters carrying data at a data rate of approximately 2.5 Gigabit. In some embodiments of the present disclosure, the cable may be a Category 5e cable. Such an integrated connector module as described may connected a wireless access point to a network.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A system comprising:
a link layer device that receives a network cable; and
an integrated connector that connects the system to an another system, the integrated connector comprising:
a multi-gig pin area comprising at least six signal pins capable of supporting multi-gigabit data rates; and
an universal power over Ethernet (UPoE) pin area comprising four pins, wherein a first pin forms a first power source, a second pin of forms a return for the first power source, a third pin forms a second power source, and a fourth pin forms a return for the second power source, the four pins enabling universal power over Ethernet (UPoE).

2. The system of claim 1, wherein the multi-gig pin area comprises 14 signal pins.

3. The system of claim 2, wherein channel Common Mode sense pins are removed from the multi-gig pin area.

4. The system of claim 1, wherein the UPoE pin area is positioned above the multi-gig pin area.

5. The system of claim 1, wherein the UPoE pin area is positioned below the multi-gig pin area.

6. The system of claim 1, wherein the UPoE pin area is positioned to the side of the multi-gig pin area.

7. The system of claim 1, wherein twelve pins enable data transmission in the multi-gig pin area at a plurality of the following Ethernet data rates: 10 Megabit, 100 Megabit, 1 Gigabit, 2.5 Gigabit, 5 Gigabit, and 10 Gigabit.

8. The system of claim 1, wherein multi-gig pin area and the UPoE pin area are separated by a clearance at least far enough to meet IEEE high voltage (2 kV) safety isolation measurements.

9. The system of claim 1, further comprising:
center tap pins capable of removal for minimization of a depth associated with the integrated connector module.

10. A method comprising:
providing multi-gig data transmission through a multi-gig data pin area having at least six pins; and
providing an universal power over Ethernet (UPoE) power to support the multi-gig transmission through a second plurality of pins comprising a UPoE power pin area, wherein providing the UPoE power comprises:
forming a first power source on a first pin,
forming a return path for the first power source on a second pin,
forming a second power source on a second pin, and
forming a return path for the second power source on a fourth pin.

11. A system comprising:
a link layer device that receives a network cable; and
an integrated connector capable of supporting multi-gigabit data rates, wherein the integrated connector enables universal power over Ethernet (UPoE) through four pins located on the integrated connector separate from a plurality of data pins supporting multi-gigabit data rates, wherein a first pin forms a first power source, a second pin forms a return for the first power source, a third pin forms a second power source, and a fourth pin forms a return for the second power source.

12. The system of claim 11, further comprising:
a physical layer (PHY) circuit connected to and from an application-specific integrated circuit (ASIC) wherein the multi-gigabit data rates are supported by the PHY circuit.

13. The system of claim 12, using a Serial Gigabit Media Independent Interface (SGMII) protocol to accommodate the multi-gigabit rates.

14. The system of claim 13, wherein the SGMII protocol is coded to carry data at a plurality of the following Ethernet data rates: 10 Megabit, 100 Megabit, 1 Gigabit, 2.5 Gigabit, 5 Gigabit, and 10 Gigabit.

15. The system of claim 14, further comprising:
a cable over 100 meters carrying data at a data rate of approximately 2.5 Gigabit.

16. The system of claim 15, wherein the cable comprises a Category 5e cable.

17. The system of claim 14, wherein the SGMII protocol is coded to change from a first data rate to a second data rate of the plurality of data rates.

18. The system of claim 13, further comprising:
a wireless access point connected to a network through the integrated connector module.

19. The system of claim 12, further comprising:
the physical layer (PHY) circuit connected to and from an application-specific integrated circuit (ASIC) through a fast auto-negotiation process to determine an appropriate data rate.

20. The system of claim 11, further comprising four pairs of data pins, wherein the four pairs of data pins supports the enablement of UPoE.

\* \* \* \* \*